(12) United States Patent
Williams et al.

(10) Patent No.: US 6,589,134 B2
(45) Date of Patent: Jul. 8, 2003

(54) SYSTEM WITH CONTROLLER AND METHOD FOR CONTROLLING A PARK-INTERLOCK DEVICE IN A VEHICLE

(75) Inventors: John Derek Williams, New Palestine, IN (US); Gerald Thomas Fattic, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/965,183

(22) Filed: Sep. 27, 2001

(65) Prior Publication Data

US 2003/0060327 A1 Mar. 27, 2003

(51) Int. Cl.⁷ ............................................... F16H 59/74
(52) U.S. Cl. ......................... 477/99; 477/19; 477/197; 192/219.1; 192/219.4
(58) Field of Search ......................... 477/99, 19, 23, 477/195, 197; 192/219.1, 219.4, FOR 101, FOR 110; 303/192

(56) References Cited

U.S. PATENT DOCUMENTS

| 5,009,295 A | * | 4/1991 | Kinkade et al. ......... 192/220.2 |
| 5,139,315 A | * | 8/1992 | Walenty et al. ............. 303/162 |
| 5,314,049 A | | 5/1994 | Nordstrom |
| 5,474,164 A | | 12/1995 | Berger |
| 5,484,044 A | * | 1/1996 | Bursteinas et al. ......... 188/353 |
| 5,696,679 A | | 12/1997 | Marshall et al. |
| 5,788,596 A | | 8/1998 | Robinson et al. |
| 5,827,149 A | | 10/1998 | Sponable |
| 5,846,160 A | | 12/1998 | Tuday |
| 5,862,899 A | | 1/1999 | Dahlstrom |
| 5,954,179 A | | 9/1999 | Osborn |
| 6,019,436 A | * | 2/2000 | Siepker ....................... 303/13 |
| 6,050,377 A | | 4/2000 | Cederberg et al. |
| 6,093,974 A | | 7/2000 | Tabata et al. |
| 6,124,645 A | | 9/2000 | Jones et al. |
| 6,142,282 A | | 11/2000 | Rudisil et al. |
| 6,209,408 B1 | | 4/2001 | DeJonge et al. |
| 6,209,672 B1 | | 4/2001 | Severinsky |
| 6,273,232 B1 | | 8/2001 | Kimura et al. |
| 6,286,633 B1 | | 9/2001 | Kim |
| 6,293,363 B1 | * | 9/2001 | Rangaswamy et al. ..... 180/287 |
| 6,361,469 B1 | * | 3/2002 | Roder et al. .................. 477/24 |

\* cited by examiner

*Primary Examiner*—Sherry Estremsky
*Assistant Examiner*—Tisha D. Lewis
(74) *Attorney, Agent, or Firm*—Margaret A. Dobrowitsky

(57) ABSTRACT

Method, system and controller for electronically controlling a park-interlock device in a land-based vehicle are provided. The method allows for providing a driver-selectable shifter for selecting a respective one of a plurality of propulsion modes of the vehicle. One of the propulsion modes is a park mode. The method further allows for sensing at least one vehicle parameter for determining whether or not the park interlock device is to be actuated to a respective interlock state corresponding to the driver-selected mode and/or an operational mode automatically determined by a controller for stopping and starting during a Hill-hold function in an electric, hybrid electric vehicle. Memory is provided for storing nominal values for each vehicle parameter. A comparing action allows to compare the sensed vehicle parameters relative to the nominal parameter values stored in memory. Based on the results of the comparison, the method allows for generating a control signal for commanding the interlock device to the respective interlock state.

11 Claims, 3 Drawing Sheets

SYSTEM WITH CONTROLLER AND METHOD FOR CONTROLLING A PARK-INTERLOCK DEVICE IN A VEHICLE

BACKGROUND OF THE INVENTION

The present invention is generally related to processor-based control techniques for vehicles, and, more particularly, to system with controller and method for electronically controlling a park-interlock device in a land-based vehicle. More specifically, the present invention allows for utilizing the park-interlock device to control vehicle roll in a vehicle equipped with an electric/hybrid electric or ISG (Integrated Starter Generator) propulsion system requiring implementation of a "Hill-hold" function during stop/start of the vehicle.

Presently prescribed governmental regulations and/or standards, such as the Federal Motor Vehicle Safety Standards, (FMVSS) require the installation of a parking interlock device to mechanically lock the wheels of the vehicle when parked. Typically, this is accomplished by locking the output shaft of the transmission, thus preventing the vehicle wheels from rotating when the shift selector is placed in the 'Park' position. One of the purposes of this device is to prevent the vehicle from rolling when parked on a surface with a gradient, i.e., a surface with a slope or inclination. This requirement also applies to electric or hybrid electric vehicles, such as may be equipped with an ISG system. Thus, an interlock park device would be needed as part of the electric power train regardless of whether or not the vehicle is equipped with an automatic transmission.

In known implementations, the interlock device is generally responsive to a shift selector lever that includes Park, Reverse, Neutral, and at least one forward Drive position. The shift lever includes a cable connected to a pawl lever anchored by a pivot pin connected to the transmission case. A toothed pawl gear is mounted on the output shaft of the transmission, and a toggle or plunger, which is spring loaded (e.g., by torsion springs) provides an engagement force with the pawl gear so as to mechanically lock the output shaft connected to the driven wheels of the vehicle. Thus, known park interlocking devices are commonly actuated by a mechanical linkage to the gear shift selector lever, e.g., cable and associated components. The FMVSS prescribes the conditions to which the device must perform. Examples of these conditions include: "Ratchet", Hill-hold (tooth abutment condition), and vehicle roll to prescribed lock-up limits. Various values of surface gradients and limiting speeds are prescribed in the FMVSS, and the device must comply with such standards, or any applicable standards.

The shortcomings of known mechanically controlled park interlocking devices, in general, are the difficulties in systematically managing the required shift effort, linkage tolerances, and lack of fault detection as to faults that may develop in the interlocking device. For example, the mechanical linkage between the interlocking device and the shift selector may result in mismatched detent combs, misalignment of the park interlock position and inadequate engagement loads to the park interlock to quickly achieve the appropriate locking functionality. This could ultimately result in inadequate Hill-hold engagement performance (e.g., the vehicle may roll down hill faster than the park interlock can engage) and/or high "ratchet-down" engagement speed (e.g., if the shift selector is placed in Park while the vehicle is moving above some relatively low speed, e.g., approximately 5.0 mph, the interlock device might engage, and result in bodily injury to the occupants, equipment damage, or both).

Within the field of electric/hybrid electric and ISG propulsion systems, in order to economically and reliably benefit from on demand "Hill-hold" functionality from the park-interlock device, it would be desirable to provide "interlock-by-wire", i.e., electronically-based, control techniques and device responsive to electrical signals from a controller, as opposed to a purely mechanically controlled interlock device, that avoids the above-described difficulties. It would be further desirable to provide an interlock device, capable of being directly controlled by the electric/hybrid or ISG controller, including a sensor for detecting malfunctions in the device. It would also be desirable to provide techniques for controlling an interlock park device in an electric, ISG or hybrid electric vehicle in order to utilize the park-interlock device for the purpose of "Hill-hold" in the stop/start mode of operation without resorting to complex control algorithms, expensive sensors or without having to perform burdensome hardware modifications to the vehicle.

BRIEF SUMMARY OF THE INVENTION

Generally, the present invention fulfills the foregoing needs by providing in one aspect thereof a method for controlling a park-interlock device in a land-based vehicle, such as an electric/hybrid electric or ISG equipped vehicle. The vehicle includes a driver-selectable shifter for selecting a respective one of a plurality of propulsion modes of the vehicle. One of the propulsion modes is a park mode. The method allows for configuring a controller to determine at least one operational mode for stopping and starting a vehicle. The method further allows for sensing at least one vehicle parameter for determining whether or not the park interlock device is to be actuated to a respective interlock state corresponding to the driver-selected mode and/or the controller-determined operational mode. Memory is provided for storing nominal values for each vehicle parameter. A comparing action allows to compare the sensed vehicle parameters relative to the nominal parameter values stored in memory. Based on the results of the comparison, the method allows for generating a control signal for commanding the interlock device to the respective interlock state.

The present invention further fulfills the foregoing needs by providing in another aspect thereof, a method for controlling a park-interlock device in a land-based vehicle. The method provides a driver-selectable shifter for selecting a respective one of a plurality of propulsion modes of the vehicle. The method further allows for providing a controller configured to determine at least one operational mode for stopping and starting the vehicle during a Hill-hold vehicle operation. A storing action allows to store a plurality of park interlock logical rules for determining whether or not the park interlock device should be actuated to a respective interlocking state based, at least in part, on the respective propulsion mode selected by the driver, and/or based on the operational stop/start mode determined by the controller, e.g., an ISG controller. The park interlock rules are processed using at least one vehicle parameter so that based on the actual values of each vehicle parameter relative to a nominal set of vehicle parameter values, a control signal for commanding the interlock device to the respective interlock state is generated.

In one aspect thereof, the present invention provides a system for controlling a park-interlock device in a land-based vehicle. The system includes a driver-selectable shifter for selecting a respective one of a plurality of propulsion modes of the vehicle. A controller is configured to determine at least one operational mode for stopping and starting the vehicle. At least one sensor is provided for sensing at least one vehicle parameter for determining whether or not the park interlock device is to be actuated to a respective interlock state corresponding to the driver-selected mode and/or the controller-determined mode. The system includes a memory for storing nominal values for the vehicle parameters. A comparator is configured to compare each sensed vehicle parameter relative to the values stored in memory so that based on the results of the comparison, a control signal for commanding the interlock device to the respective interlock state is generated by the controller.

In yet another aspect thereof, the present invention provides a controller for controlling a park-interlock device in a land-based vehicle with a driver-selectable shifter for selecting a plurality of propulsion modes of the vehicle. The controller is responsive to at least one sensor for sensing at least one vehicle parameter for determining whether or not the park interlock device is to be actuated to a respective interlock state. The controller includes memory configured to store a plurality of park interlock logical rules for determining whether or not the park interlock device should be actuated to a respective interlocking state based on the respective propulsion mode selected by the driver and/or as determined by the controller while stopping and starting the vehicle in accordance with prescribed vehicle regulations. The memory is further configured for storing nominal values for the vehicle parameters. A comparator is configured to compare each sensed vehicle parameter relative to the nominal values stored in memory so that based on the results of the comparison, a control signal for commanding the interlock device to the respective interlock state is generated by the controller. In one aspect of the invention, the functional state of the park-interlock device is determined or coordinated relative to a Hill-hold function provided during stop/start of a hybrid/electric vehicle equipped with an ISG propulsion system, for example.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
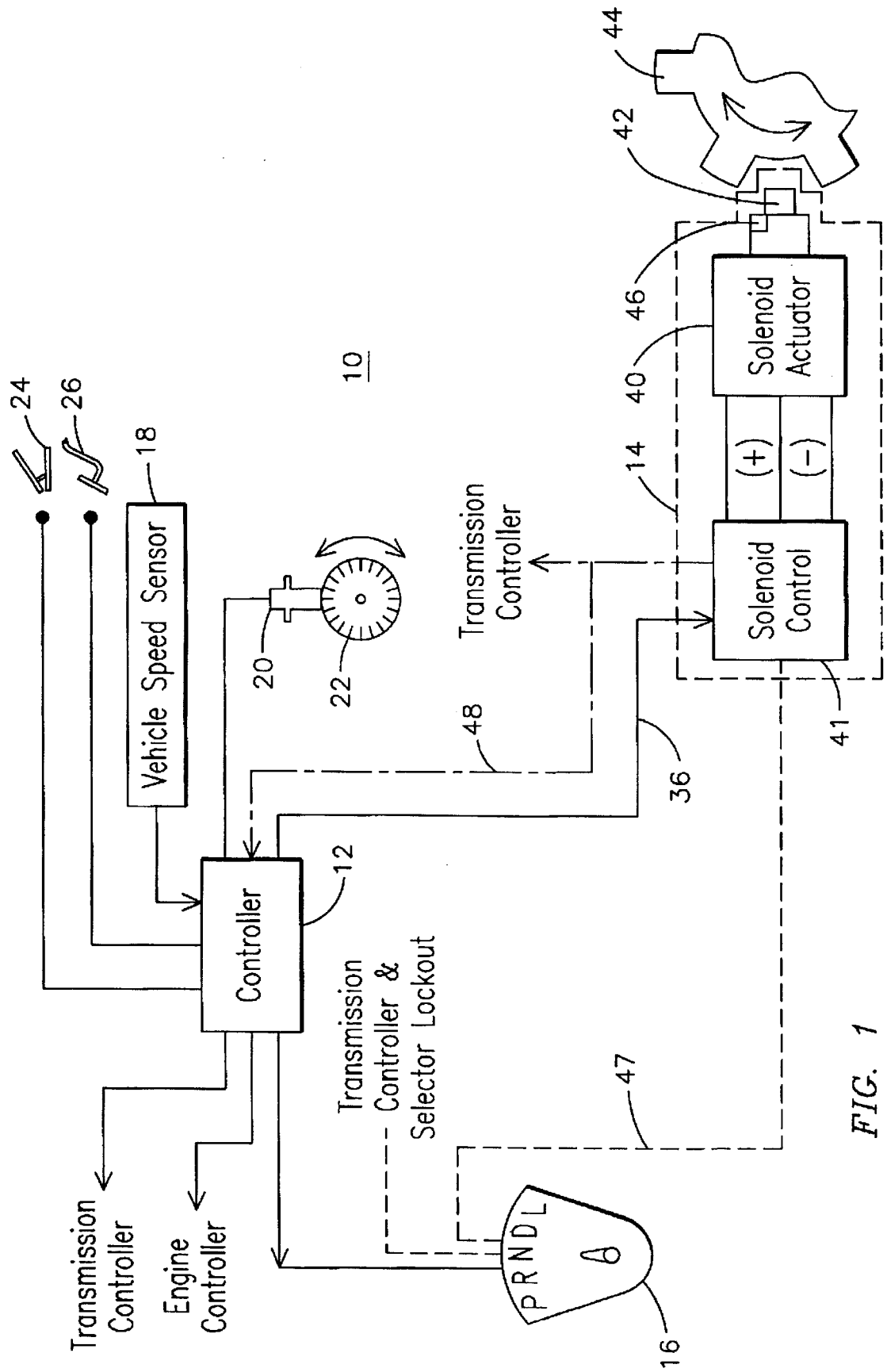
FIG. 1 illustrates an exemplary schematic representation of a control system including a controller for electronically controlling a park-interlock device in a land-based vehicle.

FIG. 1 illustrates a schematic representation of a control system 10 including a controller 12 for electronically controlling a park-interlock device 14 in a land-based vehicle, such as an electric or hybrid electric vehicle that may be equipped with an Integrated Starter Generator (ISG) subsystem, part of its propulsion drive system. For readers who desire background information regarding innovative propulsion systems and techniques having a relatively wide speed range, high torque per ampere, high efficiency, quick dynamic response, and operational robustness and reliability under tough environmental or operational conditions, reference is made to U.S. patent application Ser. No. 09/928,613 filed Aug. 13, 2001; and Ser. No. 09/909,356 filed Jul. 19, 2001, commonly assigned to the assignee of the present invention, and herein incorporated by reference.

FIG. 1 illustrates a driver-selectable shifter 16 for selecting a respective one of a plurality of propulsion modes of the vehicle, such as Park, Reverse, Neutral, and at least one forward Drive mode. In accordance with aspects of the invention, at least one sensor is provided for sensing at least one vehicle parameter for determining whether or not the park interlock device 14 is to be actuated to a respective interlock state corresponding to the driver-selected mode. The actuation of the park-interlock device to the respective interlocking state may be further based on an operational mode determined by the controller. One example of the operational mode determined by the controller may comprise a stop/start mode, as may be implemented during a Hill-hold mode of operation of the vehicle. Examples of the vehicle parameters include: vehicle speed, such as may be sensed with a standard vehicle speed sensor 18, e.g., a tachometer or equivalent; engine speed, such as may be sensed with a standard engine speed sensor 20, such as a Hall, or magneto-resistive sensor that may be electromagnetically excited by a target wheel 22, or a standard crank sensor or equivalent, using techniques well-understood by those skilled in the art; throttle command, such as may be sensed by sensing position of a throttle pedal 24 or equivalent; braking state, such as may be sensed by sensing position of a brake pedal 26 or equivalent; and the propulsion mode selected by the driver such as may be sensed by sensing the position selected by the driver on the shift selector.

Figure 2:
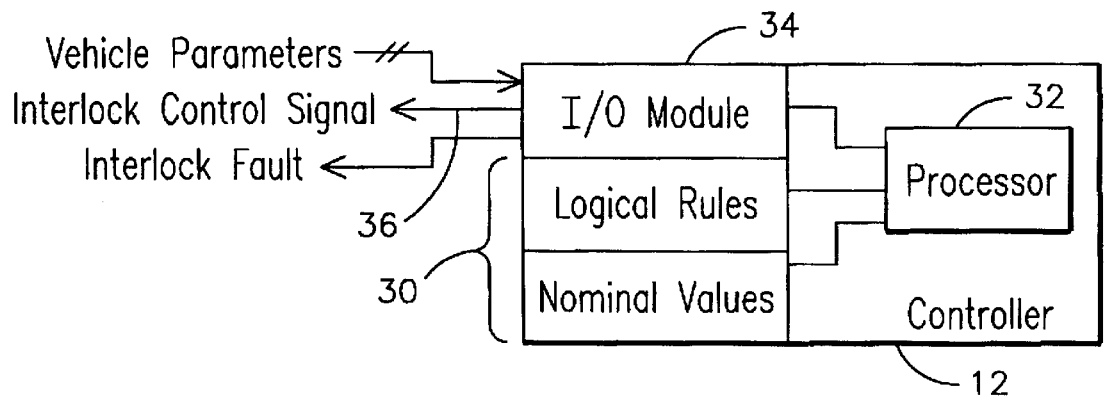
FIG. 2 is a block diagram representation of one exemplary embodiment of the controller of FIG. 1 in accordance with aspects of the invention.

FIG. 2 illustrates an exemplary embodiment of controller 12 in accordance with aspects of the invention. Controller 12 includes a memory 30 for storing a plurality of park interlock logical rules for determining whether or not the park interlock device 14 (FIG. 1) should be actuated to a respective interlocking state based, at least in part, on the respective propulsion mode selected by the driver. As suggested above, the interlocking state may be further based on the appropriate stop/start operational mode of the vehicle for implementing the Hill-hold function. The controller automatically determines the operational stop/start mode. The memory 30 may further be used for storing a set of nominal values for the vehicle parameters. The nominal values may be experimentally and/or analytically derived for a given application or may be based on any applicable prescribed standards for the given application. A processor 32 is configured to process the park interlock rules stored in memory 30 using at least one vehicle parameter supplied through a suitable input/output module 34 so that based on the actual values of each vehicle parameter relative to the nominal set of vehicle parameter values, a control signal 36 for commanding the interlock device to the appropriate interlock state is generated. In one exemplary embodiment, the controller 12 may be the same controller that provides the control for the ISG subsystem. It will be understood, however, that controller 12 may be a stand-alone controller or incorporated into other controllers that may be used by the propulsion system, such as the engine controller in a hybrid electric vehicle, or electric machine controller in an electric vehicle, or a transmission controller in a vehicle so equipped.

Figure 3:
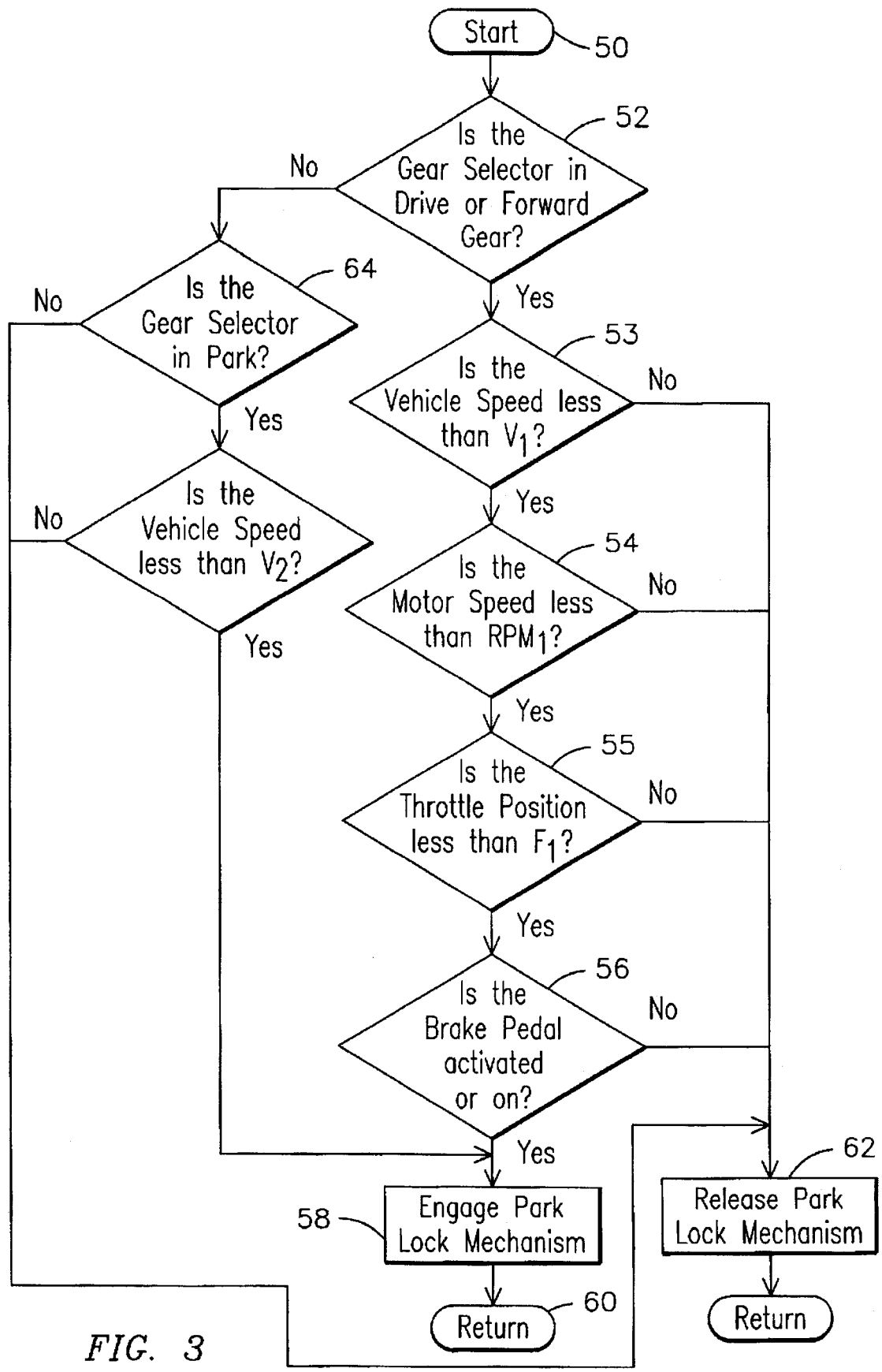
FIG. 3 is a flow chart of an exemplary control flow of actions that may be performed by the controller of FIGS. 1 and 2 in accordance with aspects of the invention.

FIG. 3 is a flow chart of an exemplary flow of actions that may be performed by controller 12 in accordance with aspects of the invention. As suggested above, the controller 12 processes the information from the gear shifter or selector, engine speed sensor, vehicle speed sensor, throttle position sensor, and brake pedal sensor to determine the operation of the park interlock device. Subsequent to starting action 50, decision block 52 allows for sensing whether the gear shifter of the vehicle is in drive or any other forward gear. If the vehicle is in drive or any other forward gear, and each of logical rules 53 through 56 appropriately indicate within predefined tolerances a stopped vehicle with an engine not turning, then, prior to return action 60, the park interlock device will be commanded to the locked position to keep the vehicle from rolling. It will be appreciated by those skilled in the art that the set of logical rules 53 through 56 comprises one exemplary sequence of logical rules. However, it will be understood that the present invention is not limited either to such a sequence or to any of the exemplary logical rules illustrated in FIG. 3 since those skilled in the art will readily understand that the logical rules may be performed in any desired combination or without following any specific sequential order. The actual values of the vehicle parameters, such as vehicle speed, engine speed, throttle position and brake pedal position are respectively compared relative to the nominal values for the vehicle parameters to determine whether the vehicle is approaching a stopped condition, and/or the engine is approaching a non-turning condition. For example, the vehicle speed is compared at block 53 against a nominal value of vehicle speed, e.g., nominal vehicle speed $V_1$. Engine speed is compared at block 54 against a nominal value of revolutions per minute for the engine, e.g., nominal engine speed $RPM_1$. Throttle position is compared at block 55 to determine whether a throttle position or command is less than a nominal percentage of the full throttle position, e.g., percentage $F_1$. Braking state is compared at block 56 to determine whether or not the driver is depressing the brake pedal. In one exemplary embodiment, the nominal vehicle speed $V_1$ is about 1 mph (about 1.61 Km/h; the nominal engine speed is about 50 rpm; and the nominal throttle position $F_1$ corresponds to about 2% of full throttle. It will be appreciated that the present invention is not limited to such exemplary nominal values since the set of nominal values for the vehicle parameters may vary based on the requirements of any given application. When the vehicle speed exceeds the nominal value $V_1$; the engine speed exceeds the nominal value $RPM_1$; the throttle is actuated above the nominal throttle percentage $F_1$; or the brake pedal is released, then the park interlock device will be released, as shown at block 62 in anticipation of movement of the vehicle.

As further shown in FIG. 3, and more specifically at block 64, if the gear selector is in the park position, the park interlock device will be placed in the lock position as shown at block 58, provided the vehicle speed is less than a predefined vehicle speed value, e.g., vehicle speed value $V_2$ that in one exemplary embodiment is about 5 mph. This allows the interlock device to be set into the locked position at relatively low vehicle speeds or at a stopped condition. This avoids subjecting the occupants of the vehicle to any undue force and further avoids damage to the transmission and/or associated equipment when selecting the park position while the vehicle is moving at higher speeds.

Figure 4:
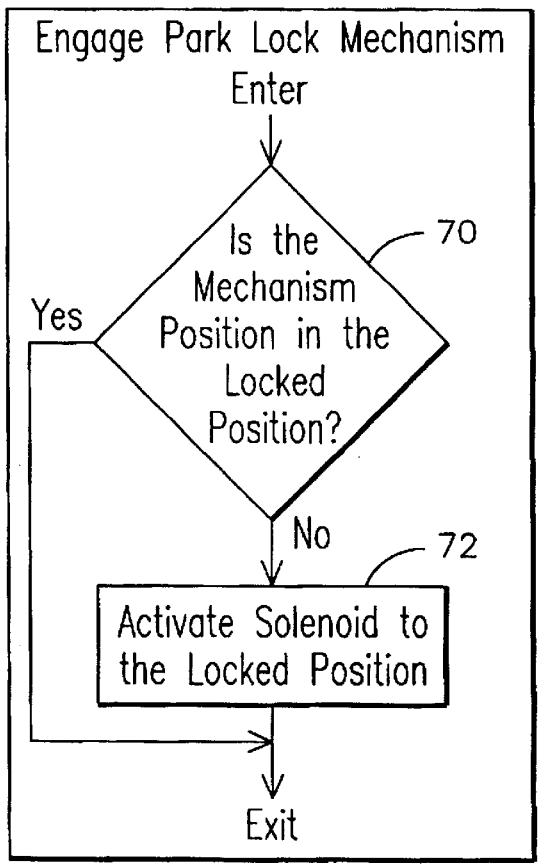
FIGS. 4 and 5 respectively illustrate exemplary details in connection with some of the actions depicted in the control flow of FIG. 3

As shown at FIG. 4, the "Engage Park Lock Mechanism", depicted in block 58 of FIG. 3, comprises checking at block 70 the position of the mechanism to determine the present state of the device. It will then actuate at block 72 a solenoid 40 (FIG. 1) through a suitable solenoid drive circuit 41 (FIG. 1) to extend a plunger or pawl 42 (FIG. 1) into one of the gaps of a toothed pawl gear 44 (FIG. 1), and thus set the park interlock device to the locked position. If the device is in the locked position, the solenoid would not need to be actuated. In accordance with aspects of the present invention, a fault indication would be generated when the present state of the interlock device is incongruous with the state corresponding to the last control signal for the interlock device. For example, a plunger position sensor 46 (FIG. 1), such as a Hall sensor, magneto-resistive sensor, capacitive sensor or other type of position sensor, may be used for determining whether the plunger 42 failed to extend to engage the pawl gear when commanded to do so.

Figure 5:
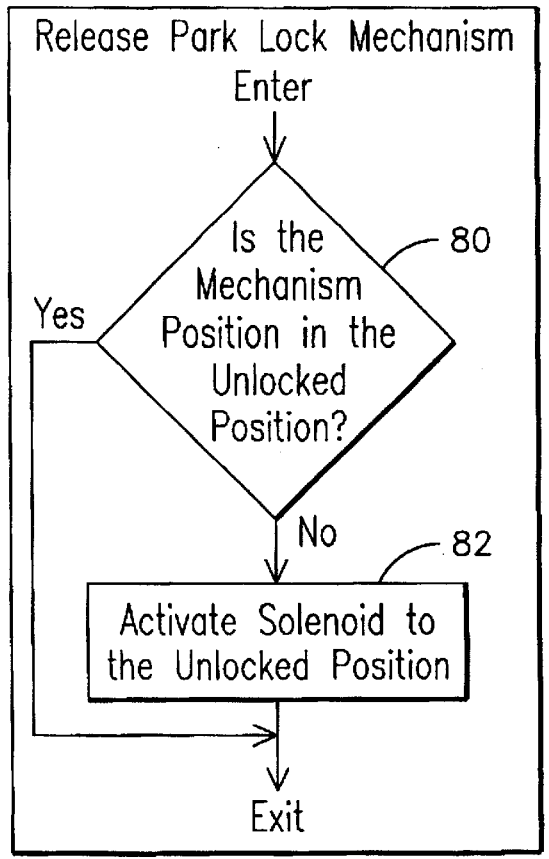

As shown at FIG. 5, the "Release Park Lock Mechanism", depicted in block 62 of FIG. 3, comprises checking at block 80 the position of the mechanism to determine the present state of the device. It will then actuate at block 82 the solenoid 40 (FIG. 1) as commanded by the control signal 36 to retract the plunger 42 (FIG. 1) to the unlocked position. If the device is in the unlocked position, the solenoid would need to be actuated. As suggested above, a fault indication would be generated when the present state of the interlock device is incongruous with the state corresponding to the last control signal for the interlock device. For example, the plunger position sensor 46 would be used for determining whether the plunger 42 failed to retract from the pawl gear when commanded to do so.

Returning to FIG. 1, it will be appreciated that the control system 10 is built with backup redundancies to ensure reliable operation and graceful degradation in the presence of malfunctions. For example, as conceptually represented by dashed line 47, in the event a malfunction were to develop in the controller 12, the interlock device control would be delegated to be based on the position of the gear selector. For example, if the gear selector were set to Park, then the interlock device would be commanded to the locking state, as would be the case in a standard park interlock application. Further, as suggested above, dashed line 48 conceptually represents plunger position information that may be supplied to the controller 12 so that an appropriate warning message or indication may be displayed to the driver, or in some applications, the operation of the propulsion system may be gracefully degraded to allow the driver to reach a service shop for appropriate servicing or repair.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a park-interlock device in a land-based vehicle with a driver-selectable shifter for selecting a respective one of a plurality of propulsion modes of the vehicle, one of the propulsion modes comprising a park mode, the method comprising:

configuring a controller to determine at least one operational mode for stopping and starting the vehicle;

sensing at least one vehicle parameter for determining whether or not the park interlock device is to be actuated to a respective interlock state corresponding to the driver-selected mode and/or the controller-determined operational mode;

providing memory for storing nominal values for each vehicle parameter;

comparing the sensed vehicle parameters relative to the values stored in memory;

based on the results of the comparison, generating a control signal for commanding the interlock device to the respective interlock state;

sensing a present state of the interlock device, wherein the signal for commanding the interlock device is further based on the present state of the interlock device; and generating a fault indication when the present state of the interlock device is incongruous with the state corresponding to the last control signal for the interlock device.

2. The control method of claim 1 wherein the vehicle is selected from the group consisting of electric, and electric-hybrid vehicles, and the operational mode of the vehicle comprises a Hill-hold operation while stopping and starting the vehicle.

3. The control method of claim 1 wherein the vehicle parameter is selected from the group consisting of vehicle speed, engine speed, throttle command, braking state, and the propulsion mode selected by the driver.

4. A method for controlling a park-interlock device in a land-based vehicle, the method comprising:

providing a driver-selectable shifter for selecting a respective one of a plurality of propulsion modes of the vehicle;

providing a controller configured to determine at least one operational mode for stopping and starting the vehicle during a Hill-hold vehicle operation;

storing a plurality of park interlock logical rules for determining whether or not the park interlock device should be actuated to a respective interlocking state based on the respective propulsion mode selected by the driver and/or the controller-determined operational mode;

processing the park interlock rules using at least one vehicle parameter so that based on the actual values of each vehicle parameter relative to a nominal set of vehicle parameter values, a control signal for commanding the interlock device to the respective interlock state is generated;

sensing a present state of the interlock device, wherein the signal for commanding the interlock device to the respective interlock state is further based on the present state of the interlock device; and generating a fault indication when the present state of the interlock device is incongruous with the state corresponding to the last control signal for the interlock device.

5. The control method of claim 4 further comprising providing a respective sensor for sensing each vehicle parameter for determining whether or not the park interlock device should be actuated to the respective interlocking state.

6. The control method of claim 4 further comprising providing memory for storing the nominal values for each vehicle parameter.

7. The control method of claim 4 wherein the processing step comprises comparing the sensed vehicle parameters relative to the nominal values so that based on the results of the comparison, the control signal for actuating the interlock device is generated.

8. The control method of claim 4 wherein the vehicle parameter is selected from the group consisting of vehicle speed, engine speed, throttle command, braking state, and the propulsion mode selected by the driver.

9. A system for controlling a park-interlock device in a land-based vehicle, the system comprising:

a driver-selectable shifter for selecting a respective one of a plurality of propulsion modes of the vehicle;

a controller configured to determine at least one operational mode for stopping and starting the vehicle;

at least one sensor for sensing at least one vehicle parameter for determining whether or not the park interlock device is to be actuated to a respective interlock state corresponding to the driver-selected mode and/or the controller-determined mode;

memory for storing nominal values for the vehicle parameters;

a comparator configured to compare each sensed vehicle parameter relative to the values stored in memory so that based on the results of the comparison, a control signal for commanding the interlock device to the respective interlock state is generated by the controller;

a sensor configured to sense a present state of the interlock device, wherein the signal for commanding the interlock device is further based on the present state of the interlock device; and a module configured to generate a fault indication when the present state of the interlock device is incongruous with the state corresponding to the last control signal for the interlock device.

10. The system of claim 9 wherein the vehicle parameter is selected from the group consisting of vehicle speed, engine speed, throttle command, braking state, and the propulsion mode selected by the driver.

11. A controller for controlling a park-interlock device in a land-based vehicle including a driver-selectable shifter for selecting a respective one of a plurality of propulsion modes of the vehicle, one of the propulsion modes comprising a park mode, the controller being responsive to at least one sensor for sensing at least one vehicle parameter for determining whether or not the park interlock device is to be actuated to a respective interlock state, the controller comprising:

memory configured to store a plurality of park interlock logical rules for determining whether or not the park interlock device should be actuated to a respective interlocking state based on the respective propulsion mode selected by the driver and/or as determined by the controller while stopping and starting the vehicle in accordance with prescribed vehicle regulations, the memory further configured to store nominal values for the vehicle parameters;

a comparator configured to compare each sensed vehicle parameter relative to the values stored in memory so that based on the results of the comparison, a control signal for commanding the interlock device to the respective interlock state is generated by the controller; and a module configured to generate a fault indication when a present state of the interlock device is incongruous with the state corresponding to the last control signal for the interlock device.

* * * * *